(12) United States Patent
Tame

(10) Patent No.: US 7,325,850 B2
(45) Date of Patent: Feb. 5, 2008

(54) STOW IN FLOOR SEAT ASSEMBLY WITH MAIN LATERAL DISPLACEMENT

(75) Inventor: Omar D. Tame, West Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 10/528,686

(22) PCT Filed: Sep. 22, 2003

(86) PCT No.: PCT/US03/29457

§ 371 (c)(1),
(2), (4) Date: Oct. 6, 2005

(87) PCT Pub. No.: WO2004/026618

PCT Pub. Date: Apr. 1, 2004

(65) Prior Publication Data

US 2006/0108822 A1 May 25, 2006

Related U.S. Application Data

(60) Provisional application No. 60/412,293, filed on Sep. 20, 2002.

(51) Int. Cl.
*B60N 2/12* (2006.01)
*B60N 2/30* (2006.01)

(52) U.S. Cl. .............................. 296/65.11; 296/65.05; 296/65.13; 297/344.1

(58) Field of Classification Search ............ 296/65.01, 296/65.05, 65.11, 65.13; 297/16.1, 344.1
See application file for complete search history.

(56) References Cited

U.S. PATENT DOCUMENTS

| | | | |
|---|---|---|---|
| 2,297,176 A | 9/1942 | Thompson | |
| 2,800,947 A | 7/1957 | Thiem | |
| 3,637,253 A | 1/1972 | Maule et al. | |
| 4,241,893 A | 12/1980 | Koutsky et al. | |
| 4,707,030 A * | 11/1987 | Harding | 297/341 |
| 4,834,452 A | 5/1989 | Goodrich | |
| 4,949,931 A | 8/1990 | Fujiwara et al. | |
| 5,104,065 A | 4/1992 | Daharsh et al. | |
| 5,158,338 A | 10/1992 | Hayakawa et al. | |
| 5,498,051 A | 3/1996 | Sponsler et al. | |
| 5,636,884 A * | 6/1997 | Ladetto et al. | 296/65.13 |
| 5,711,505 A * | 1/1998 | Nemoto | 248/424 |
| 5,927,789 A | 7/1999 | Mezzadri et al. | |
| 6,065,804 A | 5/2000 | Tanaka et al. | |
| 6,129,405 A | 10/2000 | Miyahara et al. | |
| 6,145,913 A | 11/2000 | Odagaki | |
| 6,234,574 B1 | 5/2001 | Hoshihara et al. | |
| 6,270,140 B1 * | 8/2001 | Opfer et al. | 296/65.03 |
| 6,283,550 B1 | 9/2001 | Vialatte et al. | |
| 6,286,886 B1 | 9/2001 | Odagaki | |
| 6,435,590 B2 | 8/2002 | Miyahara et al. | |
| 6,648,393 B1 * | 11/2003 | Milnar et al. | 296/65.11 |
| 6,955,386 B2 * | 10/2005 | Rhodes et al. | 296/65.09 |
| 2002/0149250 A1 | 10/2002 | Silvia | |

* cited by examiner

*Primary Examiner*—D. Glenn Dayoan
*Assistant Examiner*—Greg Blankenship
(74) *Attorney, Agent, or Firm*—Clark Hill PLC

(57) ABSTRACT

The seat assembly includes a seat cushion. A front leg is pivotally coupled to the seat cushion for movement of the seat cushion between a seating position and a forwardly dumped position. A support bracket is pivotally attached to the front legs at lower portions of the front legs. A track assembly is attached to the support bracket. The track assembly is secured in a lateral orientation to a floor of a vehicle with respect to the seat assembly; whereby the seat assembly may be moved to a plurality of positions within the vehicle.

5 Claims, 4 Drawing Sheets

STOW IN FLOOR SEAT ASSEMBLY WITH MAIN LATERAL DISPLACEMENT

RELATED APPLICATIONS

This patent application is a §371 of PCT/US03/29457, filed on Sep. 22, 2003, which claims priority to and all the benefits of U.S. Provisional Patent Application No. 60/412,293 filed on Sep. 20, 2002.

BACKGROUND OF THE INVENTION

1. Field of the Invention

The invention relates to a seat assembly for an automotive vehicle, and more particularly, to a riser assembly for manually displacing the seat cushion laterally within the vehicle.

2. Description of the Related Art

Automotive vehicles include seat assemblies for supporting occupants within the vehicle. Seat assemblies include a scat cushion and a seat back operatively coupled to the seat cushion by a recliner mechanism for allowing selective pivotal adjustment of the seat back relative to the seat cushion between a plurality of reclined seating positions. Typically, the seat back is also movable between any one of the reclined seating positions and a generally horizontal, forwardly stowed position to present a load floor surface on the back of the seat back.

It is known in the automotive seating art to mount a riser assembly between the seat cushion and the floor of the vehicle for moving the seat assembly between a seating position with the seat cushion spaced above the floor of the vehicle and a forwardly stowed position with the seat cushion disposed generally forward of the seating position and lying against the floor of the vehicle. It is also known for such a riser assembly to allow movement of the seat assembly between the seating position and a stowed position within a recess in the floor of the vehicle. However, it remains desirable to have a riser assembly that allows movement of the seat assembly between the seating position and a stowed position within a recess substantially laterally offset from the seating position.

SUMMARY OF THE INVENTION

According to one aspect of the invention, a seat assembly is provided for supporting an occupant above a floor of an automotive vehicle. The seat assembly includes a seat cushion. A front leg is pivotally coupled to the seat cushion for movement of the seat cushion between a seating position and a forwardly dumped position. A support bracket is pivotally attached to the front legs at lower portions of the front legs. A track assembly is attached to the support bracket. The track assembly is secured in a lateral orientation to a floor of a vehicle with respect to the seat assembly; whereby the seat assembly may be moved to a plurality of positions within the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
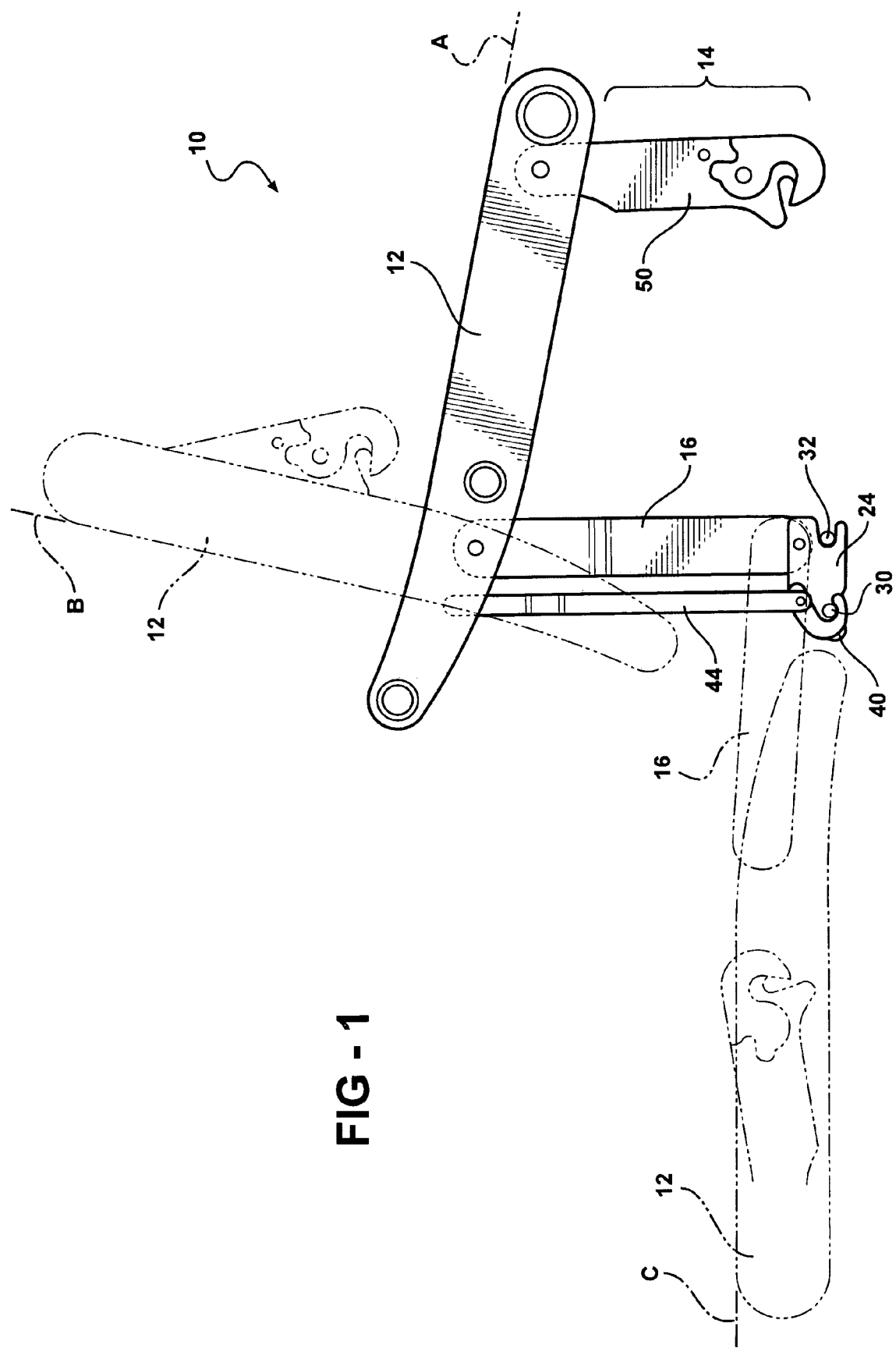
FIG. 1 is a side view of a seat assembly incorporating a riser assembly according to one aspect of the invention.

Referring to the figures, a seat assembly for supporting an occupant above a floor of an automotive vehicle is generally indicated at 10 in FIG. 1. The seat assembly 10 includes a seat cushion 12 and a seat back (not shown) pivotally coupled to the scat cushion 12 for movement between a generally upright seating position and a forwardly folded flat position overlying the seat cushion 12. A riser assembly 14 releasably interconnects the seat assembly 10 to the floor of the vehicle. Described in greater detail below, the riser assembly 14 allows movement of the seat cushion 12 between a seating position A and a forwardly dumped position B with the seat cushion 12 extending generally longitudinally upright from the riser assembly 14. The riser assembly 14 also allows movement of the seat cushion 12 between the forwardly dumped position B and a forwardly stowed position C lying generally flat upon the floor of the vehicle. The riser assembly 14 further allows the seat assembly 10 to be selectively laterally displaced along the floor of the vehicle.

Figure 2:
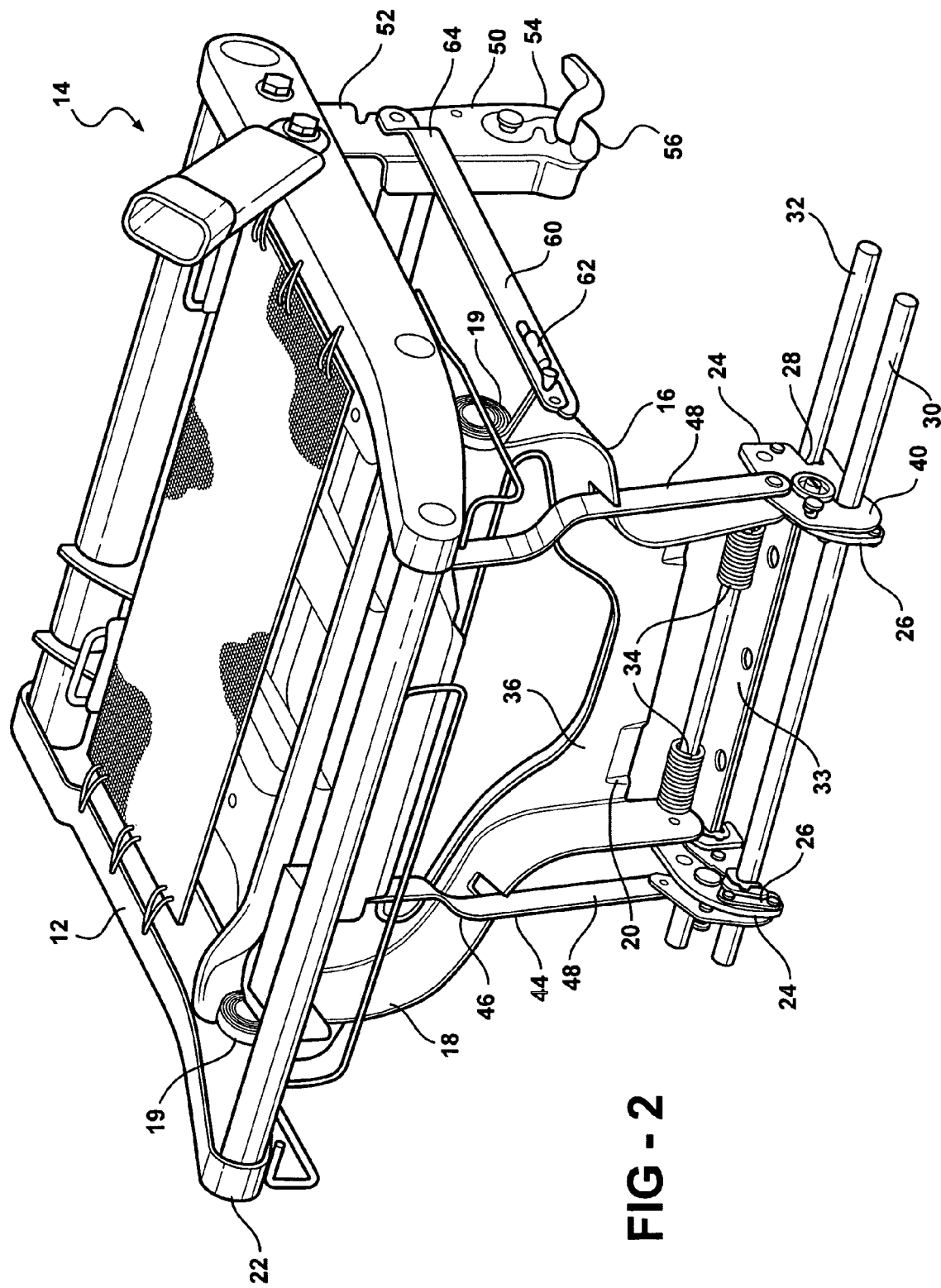
FIG. 2 is a perspective view of the seat assembly.
Figure 3:
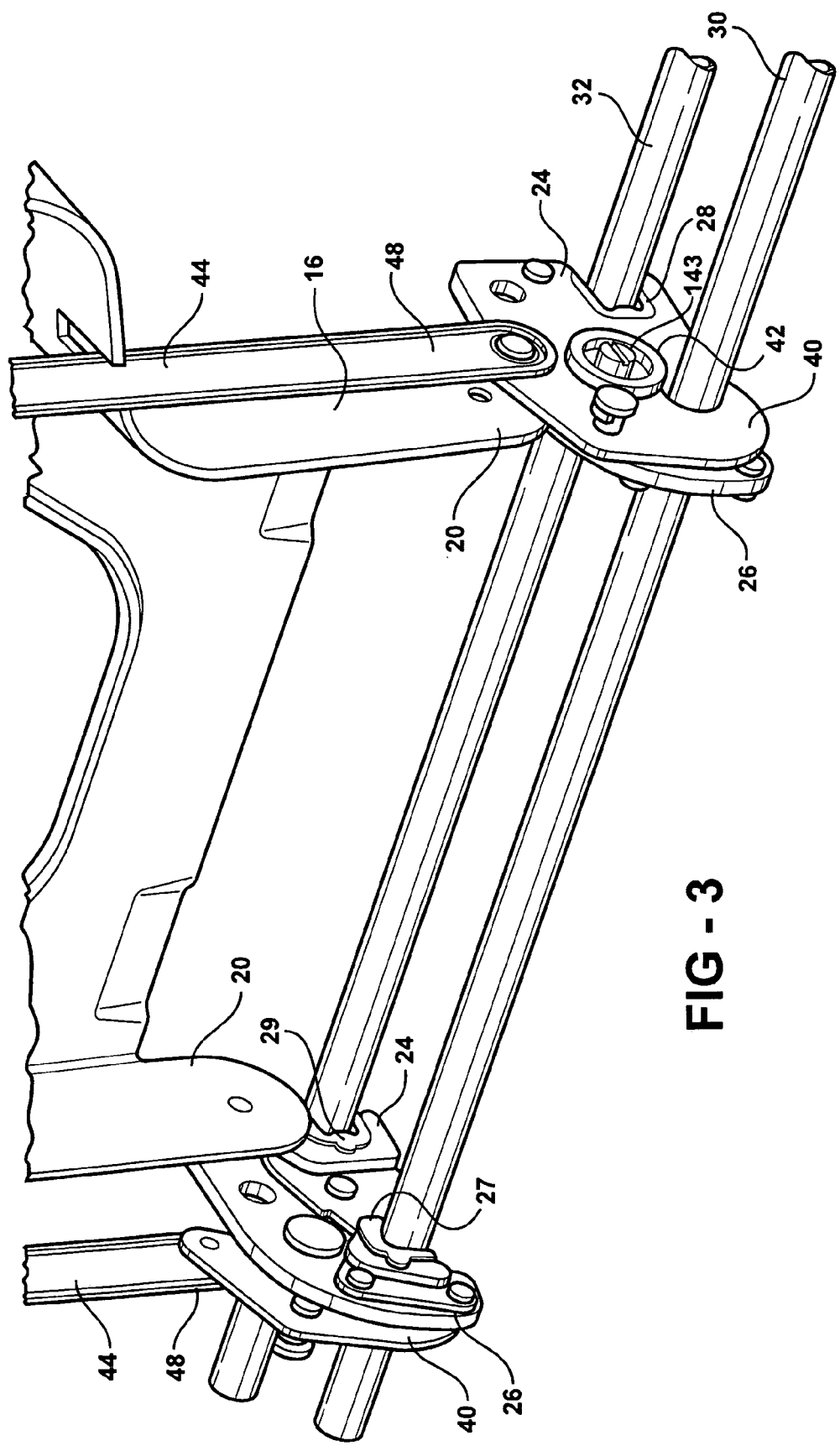
FIG. 3 is an enlarged partial view of the seat assembly.

Referring to FIGS. 2 and 3, the riser assembly 14 includes generally parallel front legs 16 each extending between upper 18 and lower 20 ends. The upper end 18 is pivotally coupled at the location of a first assist spring 19, to a front end 22 of the seat cushion 12 for movement of the seat cushion 12 between the seating A and forwardly dumped B positions. The first assist spring 19 extends between the upper end 18 of each front leg 16 and the seat cushion 12 for pivotally biasing the seat cushion 12 toward the forwardly dumped position B. The lower end 20 of each front leg 16 is pivotally coupled to a respective foot bracket 24 for movement of the front legs 16 between a support position for supporting the seat cushion 12 in the seating position A, as shown in the FIGS. 2 and 3, and a stowed position extending generally longitudinally along the floor of the vehicle. Each foot bracket 24 extends between front 26 and rear 28 hook portions. The front 26 and rear 28 hook portions are slidably engaged with generally parallel front 30 and rear 32 rods, respectively, for selective movement of the seat cushion 12 between a plurality of lateral positions within the vehicle. The front 30 and rear 32 rods are fixedly secured in a lateral orientation to the floor of the vehicle by any suitable means, such as welding or bolting. The front hook portion 26 comprises an arcuate member adapted to engage an upper portion of the front rod 30. A cinching hook 40 comprises an arcuate member adapted to engage a lower portion of the front rod 30. The front hook portion 26 and cinching hook 40 cooperate to securely engage the front rod 30. The rear hook portion 28 comprises a member having an unshaped slot adapted to engage the rear rod 32 for sliding movement therein. Preferably, rubber or polymeric bumpers 27, 29 are fixedly secured to both the front 26 and rear 28 hook portions for minimizing vibration between the foot brackets 24 and the front 30 and rear 32 rods.

The foot brackets 24 are fixedly secured to opposite sides of a central bracket 33. A second assist spring 34 extends between the lower end 20 of each front leg 16 and the central bracket 33 for biasing the front legs 16 toward the stowed position. A cross member 36 extends laterally in the vehicle between the front legs 16 for stabilizing the movement of the front legs 16 between the support and stowed positions.

The cinching hook 40 is pivotally assembled by a pivot pin 143 to the foot bracket 24 adjacent the front hook 26 for movement between a locked and unlocked position. In the locked position, the cinching hook 40 cooperates with the front hook portion 26 to bindingly cinch the front rod 30 for resisting lateral displacement of the seat assembly 10 along the front 30 and rear 32 rods. In the unlocked position, the cinching hook 40 is substantially disengaged from the front rod 30 to allow manual lateral displacement of the seat assembly 10 along the front 30 and rear 32 rods. A biasing member 42 is coupled between the foot bracket 24 and the cinching hook 40 for biasing the cinching hook 40 toward the locked position.

A link 44 extends longitudinally between an upper end 46 pivotally coupled to the seat cushion 12 and a lower end 48 pivotally coupled to the cinching hook 40 for moving the cinching hook 40 between the locked and unlocked positions in response to movement of the seat cushion 12 between the seating A and forwardly dumped B positions.

The riser assembly 14 also includes generally parallel rear legs 50 extending between upper 52 and lower 54 portions. The upper portion 52 of the rear legs 50 are pivotally coupled to the seat cushion 12 for movement of the rear legs 50 between a support position, as shown in FIGS. 2 and 3, and a stowed position aligned longitudinally along the bottom of the seat cushion 12. The lower portion 54 includes a latch hook 56 for selectively locking the rear legs 50 to a pin fixedly secured to the floor of the vehicle, as known by those of ordinary skill in the art. A link 60 extends between a front end 62 pivotally coupled to one of the front legs 16 and a rear end 64 pivotally coupled to one of the rear legs 50 for automatically moving the rear legs 50 between the support and stowed positions in response to pivotal movement of the seat cushion 12 relative to the front legs 16 between the seating A and forwardly dumped B positions. The effective length of the link 60 shortens as the seat cushion 12 is moved to the forwardly dumped position thereby pulling and pivoting the rear legs 50 to the stowed position.

In use, the front 16 and rear 50 legs extend generally upright in the support position to support the seat cushion 12 in the seating position A. The location of the link 44 associated with the cinching hook 40 in front of the pivot point of the seat cushion 12 relative to the front legs 16 pulls the link 44 to maintain the locked cinching hook 40 when in the seating position. The front rod 30 is cinched between the cinching hook 40 and the front hook portion 26 preventing manual lateral movement of the seat assembly 10 along the front 30 and rear 32 rods. The bumper 27 is compressed between the front hook portion 26 and the front rod 30 to minimize noise caused by vibration therebetween.

To move the seat cushion 12 between the seating A and forwardly dumped B positions, the latch hook 56 is released from the pin fixedly secured to the floor by suitable releasing means, such as a release lever, as commonly known by those skilled in the art. The seat cushion 12 is then freely pivotally movable between the seating A and forwardly dumped B positions. When the seat cushion 12 is moved to the forwardly dumped position B, the link 60 responsively pulls the rear legs 50 to the stowed position. Movement of the seat cushion 12 toward the forwardly dumped position B is assisted by the first assist spring 19. The link 44 is urged generally downwardly, as viewed in the figures, to move the cinching hook 40 to the unlocked position in response to the pivotal movement of the seat cushion 12 toward the forwardly dumped position B. Thus, while the seat cushion 12 is in the forwardly dumped position B, the seat cushion 12 is manually displaceable along the front 30 and rear 32 rods. Further, while the seat cushion 12 is in the forwardly dumped position B, the seat cushion 12 with the seat back in the flat position is movable to the forwardly stowed position C by pivotal movement of the front legs 16 from the support position to the stowed position. Movement toward the forwardly stowed position C is assisted by the second assist spring 34.

The seat cushion 12 may be returned to the forwardly dumped position B by rotating the front legs 16 toward the support position against the bias of the second assist spring 34. From the forwardly dumped position B, the seat cushion 12 may be pivotally moved to the seating position A against the bias of the first assist spring 19. While the seat cushion 12 is moved to the seating position A, the link 60 responsively urges the rear legs 50 to the support position from the stowed position. The link 44 is urged generally upwardly to move the cinching hook 40 toward the locked position to prevent lateral movement of the seat cushion 12 along the front 30 and rear 32 rods.

While the latch hook 56 is released from the pin fixedly secured to the floor, the seat cushion 12 may be manually laterally displaced along the front 30 and rear 32 rods by lifting the seat cushion 12 partially toward the forwardly dumped position enough to relieve the cinching action upon the front rod 30 between the cinching hook 40 and the front hook portion 26. When a desired lateral position is found, the seat cushion 12 may be allowed to return to the seating position A. The latch hook 56 lockingly engages the pin fixedly secured to the floor to lock the seat cushion 12 in the seating position A.

Figure 4:
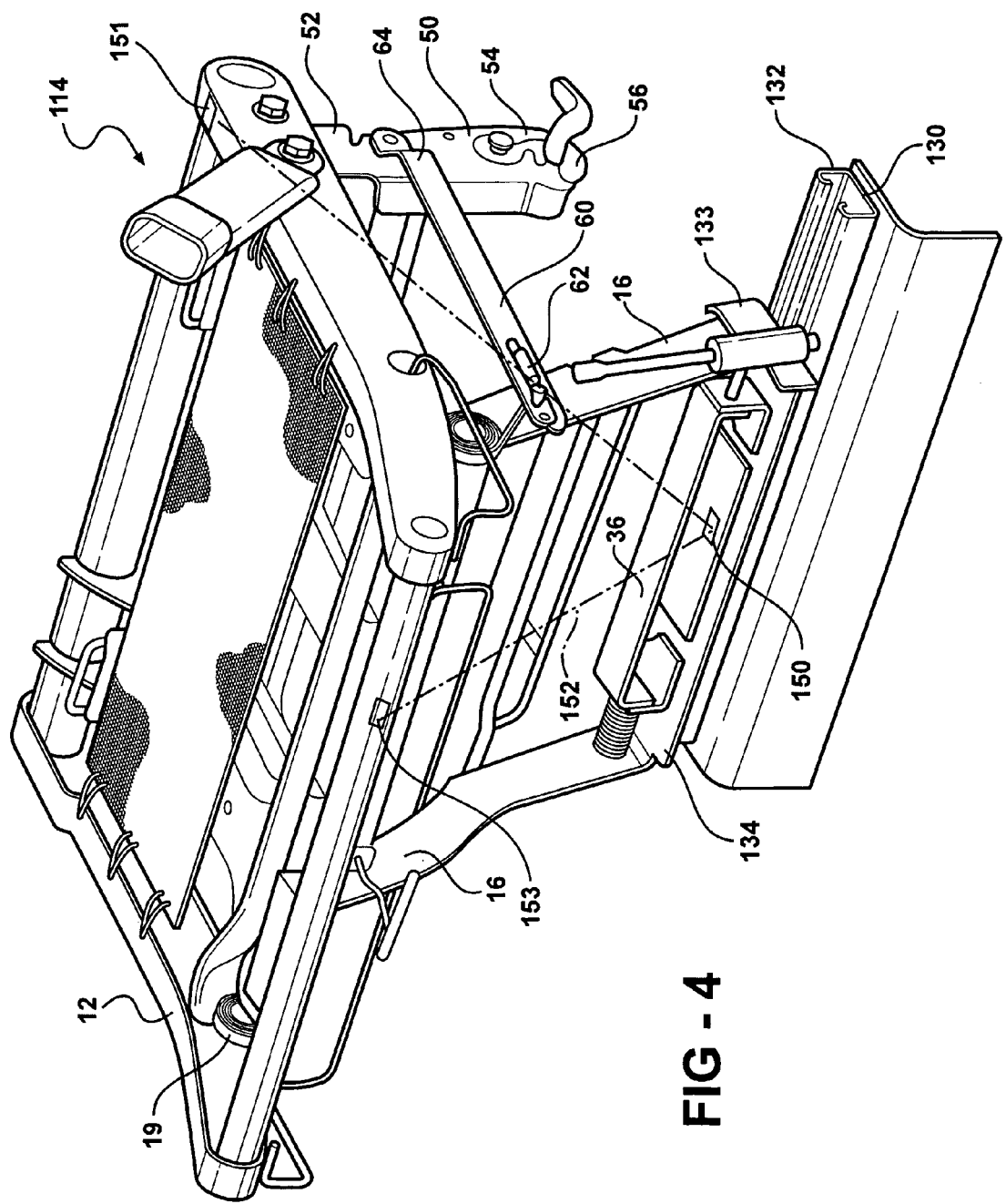
FIG. 4 is a perspective view of the seat assembly according to an alternative embodiment of the invention.

An alternative embodiment of the riser assembly is generally indicated at 114 in FIG. 4. The front legs 16 are pivotally coupled to a support bracket 133 for pivotal movement of the seat cushion 12 between the forwardly dumped position B and the forwardly stowed position C. The support bracket 133 is fixedly secured to a track assembly 130 fixedly secured in a lateral orientation to the floor of the vehicle.

More specifically, the track assembly 130 includes a lower track 132 fixedly secured to the floor of the vehicle and an upper track 134 slidably engaged to the lower track 132 for sliding movement between a plurality of lateral positions within the vehicle. A locking mechanism 150 is coupled between the lower 132 and upper 134 tracks for selectively locking the upper track 134 in any one of the plurality of lateral positions. The locking mechanism 150 is manually unlocked by a manual release mechanism 151, such as a Bowden cable and lever, depicted by the dashed line of FIG. 3. Alternatively, the locking mechanism 150 is coupled to the seat cushion 12 by a link 152 represented by the dashed line of FIG. 3 linking the locking mechanism 150 and the seat cushion 12 at 153. Appropriate links 152 include a rod or a Bowden cable, for selectively unlocking the locking mechanism 150 in response to movement of the seat cushion 12 between the seating A and forwardly dumped position B. The track assembly 130 and the locking mechanism 150 may be of any suitable type commonly known by those of ordinary skill in the art.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A seat assembly (10) for an automotive vehicle, the seat assembly comprising:
    a seat cushion (12);
    front legs (16) pivotally coupled to the seat cushion (12);
    a support bracket (133) pivotally attached to the front legs (16);
    a track assembly (130) attached to the support bracket (133), the track assembly (130) including an upper track (134) attached to the support bracket (133) and a lower track (132) adapted to be secured in a lateral orientation to a floor of the vehicle with respect to the seat assembly (10), the upper track (134) received within the lower track (132) for sliding movement therein, whereby the seat assembly (10) may be moved to a plurality of positions within the vehicle; and
    a locking mechanism (150) associated with the upper and lower tracks (134, 132) for selectively locking the upper track (134) relative to the lower track (132), wherein the locking mechanism (150) is associated with the seat cushion (12), whereby movement of the seat cushion (12) between seating and forwardly dumped positions actuates the locking mechanism (150).

2. The seat assembly (10) of claim 1 wherein the locking mechanism (150) further includes a link (152) connecting the seat cushion (12) and locking mechanism (150) for actuating the locking mechanism (150).

3. The seat assembly (10) of claim 2 wherein the link (152) is selected from the group consisting of a rod, and a Bowden cable.

4. A seat assembly (10) for an automotive vehicle, the seat assembly comprising:
    a seat cushion (12);
    front and rear legs (16, 50) pivotally coupled to the seat cushion (12);
    a support bracket (133) pivotally attached to the front legs (16);
    a latch hook (56) pivotally attached to the rear legs (50) for releasably connecting the rear legs (50) to a floor of the vehicle; and
    a track assembly (130) attached to the support bracket (133), the track assembly (130) secured in a lateral orientation to the floor of the vehicle with respect to the seat assembly (10) whereby the seat assembly (10) may be moved to a plurality of positions within the vehicle.

5. A seat assembly (10) for an automotive vehicle, the seat assembly comprising:
    a seat cushion (12);
    front and rear legs (16, 50) pivotally coupled to the seat cushion (12);
    a support bracket (133) pivotally attached to the front legs (16);
    a second link (60) extending between a first end (62) connected to the front leg (16) and a second end (64) connected to the rear leg (50) for pivoting the rear legs (50) between support and stowed positions in response to pivotal movement of the seat cushion (12) between seating and forwardly dumped positions; and
    a track assembly (130) attached to the support bracket (133), the track assembly (130) secured in a lateral orientation to a floor of the vehicle with respect to the seat assembly (10) whereby the seat assembly (10) may be moved to a plurality of positions within the vehicle.

* * * * *